No. 891,712. PATENTED JUNE 23, 1908.
A. MOLNAR.
TROLLEY.
APPLICATION FILED MAR. 14, 1908.

Witnesses
Inventor
Abel Molnar,
By H. C. Evert & Co.
Attorneys

UNITED STATES PATENT OFFICE.

ABEL MOLNAR, OF PITTSBURG, PENNSYLVANIA.

TROLLEY.

No. 891,712.  Specification of Letters Patent.  Patented June 23, 1908.

Application filed March 14, 1908. Serial No. 421,083.

*To all whom it may concern:*

Be it known that I, ABEL MOLNAR, a subject of the Emperor of Austria-Hungary, residing at Pittsburg, in the county of Allegheny and State of Pennsylvania, have invented certain new and useful Improvements in Trolleys, of which the following is a specification, reference being had therein to the accompanying drawing.

This invention relates to trolleys, and the primary object of my invention is to provide a simple and effective means for retaining a trolley wheel in connection with a trolley wire, whereby the same cannot become displaced by irregularities of the wire.

A further object of this invention is to provide an attachment for a trolley harp that will retain the trolley wheel thereof upon the trolley wire and not interfere with the overhead work of an electrically operated railway.

With the above and other objects in view which will more readily appear as the invention is better understood, the same consists in the novel construction, combination and arrangement of parts to be presently described and then specifically pointed out in the appended claims.

Figure 1:
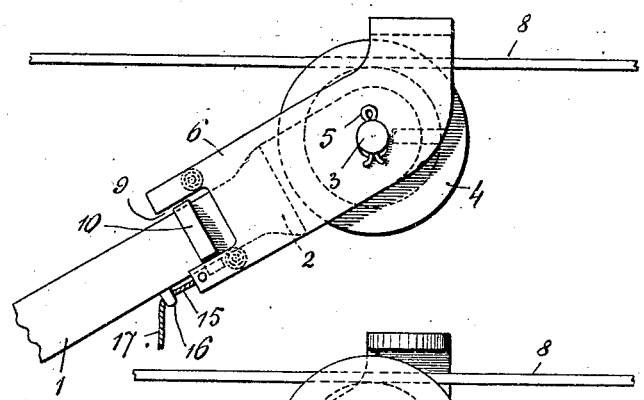
Figure 2:
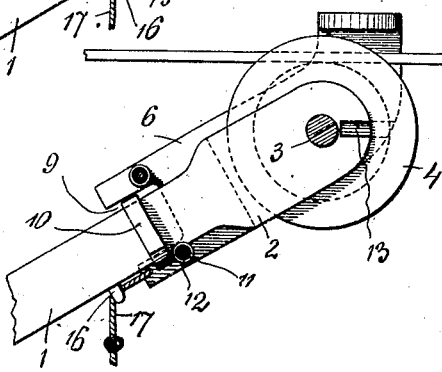

In the drawings: Figure 1 is a side elevation of a trolley harp equipped with my improvement, Fig. 2 is a similar view of the same with one of the side arms removed, Fig. 3 is a top plan of my improvement as applied to a trolley harp, and Fig. 4 is a bottom plan of the same.

In the accompanying drawings, 1 designates the upper end of the trolley pole having a harp 2 provided with a prolonged axle or spindle 3, for a revoluble trolley wheel 4, these elements being the same as used in connection with an ordinary trolley harp, with the exception of the axle 3, which is prolonged to protrude beyond the outer sides of the harp.

Loosely mounted upon the ends of the axle 3 and retained thereon by cotter pins 5 are arms 6, said arms having confronting beveled extensions 7 at their upper ends adapted to lie over the trolley wire or electrical conduit 8 with which the trolley wheel 4 contacts. The opposite ends of the arms 6 are bifurcated to provide slots 9, and extending into said slots and limiting the movement of said arms is a bracket 10, carried by the pole 1. The confronting faces of the arms 6 are provided with stud pins 11, for supporting the ends of coil springs 12 arranged between said arms. These springs are adapted to force the lower ends of the arms outwardly and maintain the extensions 7 of said arms in engagement with one another.

Figure 3:
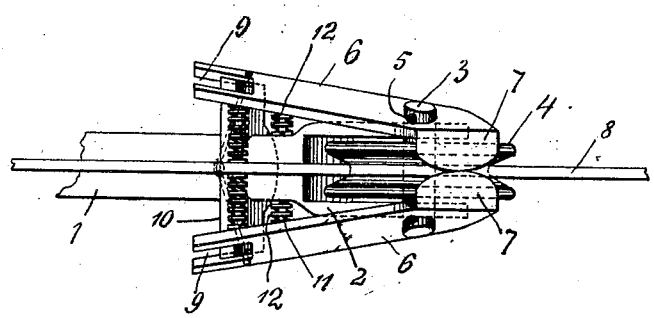
Figure 4:
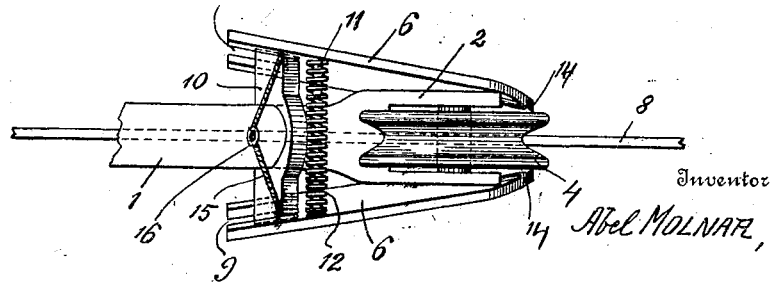

The outer sides of the harp 2 are provided with grooves 13 to receive ribs 14, carried by the confronting faces of the arms 6, said ribs normally maintaining the arms 6 in the position illustrated in Figs. 1 and 3 of the drawings.

Attached to the lower ends of the arms 6 are cables 15, these cables passing through an eyelet 16, carried by the pole 1 and connecting with a cable 17, which when pulled downwardly moves the lower ends of the arms together and separates their ends, whereby the trolley wheel 4 can be removed from the wire 8.

My trolley attachment is made of strong and durable metal, and the arms thereof are adapted to recede when passing wire hangers and similar overhead work used for supporting a trolley wire.

My invention is susceptible to such changes as are permissible by the appended claims.

Having now described my invention what I claim as new, is:—

1. The combination with a trolley harp, an axle mounted therein, and a wheel journaled upon said axle, of arms loosely mounted upon the outer ends of said axle, confronting beveled extensions carried by the upper ends of said arms and adapted to overlie said wheel, the lower ends of said arms having slots formed therein, a bracket carried by said trolley harp and extending into the slots of said arms, coil springs arranged between the lower ends of said arms for maintaining the upper ends of said arms in a closed position, ribs carried by said arms for engaging said harp and preventing displacement of said arms, and cables connected to the lower ends of said arms for spreading the upper ends thereof, substantially as described.

2. The combination with a trolley harp, the axle thereof and the wheel journaled upon said axle, of arms loosely mounted upon the ends of said axle, confronting beveled extensions carried by the upper ends of said arms and adapted to lie over said wheel, springs interposed between the lower ends of said arms for maintaining the upper ends thereof in a closed position, a bracket carried by said harp and extending into the lower ends of said arms, and cables connecting with the lower ends of said arms for spreading the upper ends thereof, substantially as described.

In testimony whereof I affix my signature in the presence of two witnesses.

ABEL MOLNAR.

Witnesses:
A. H. RABSAIG,
MAX H. SROLOVITZ.